US006203914B1

(12) United States Patent
Sudo et al.

(10) Patent No.: US 6,203,914 B1
(45) **Date of Patent: *Mar. 20, 2001**

(54) INK-FOULING PREVENTING SHEET

(75) Inventors: Momoki Sudo, Saitama-ken; Takaaki Tottori, Kyoto; Akira Toyonaga, Shiga-ken, all of (JP)

(73) Assignees: Shinoda & Co., Ltd., Tokyo; Reflite Kabushiki Kaisha, Kyoto, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,364

(22) PCT Filed: Mar. 24, 1997

(86) PCT No.: PCT/JP97/00953

§ 371 Date: Nov. 18, 1997

§ 102(e) Date: Nov. 18, 1997

(87) PCT Pub. No.: WO97/35722

PCT Pub. Date: Oct. 2, 1997

(30) Foreign Application Priority Data

| | | |
|---|---|---|
| Mar. 28, 1996 | (JP) | 8-104473 |
| Mar. 10, 1997 | (JP) | 9-072610 |

(51) Int. Cl.[7] .............................. B32B 27/40; B41F 30/00

(52) U.S. Cl. ......................... 428/423.3; 101/417; 101/418; 101/419; 428/142; 428/143; 428/144; 428/145; 428/204; 428/210; 428/325; 428/327; 428/338; 428/423.7; 428/424.2; 428/424.8; 428/425.5; 428/425.6

(58) Field of Search ...................................... 428/144, 145, 428/204, 210, 325, 327, 338, 423.3, 423.7, 424.2, 424.8, 425.5, 425.6, 142, 143; 101/417, 418, 419

(56) References Cited

U.S. PATENT DOCUMENTS 4,849,265 * 7/1989 Ueda et al. .......................... 428/40.4
5,415,935 * 5/1995 Pankratz ................................ 428/352

FOREIGN PATENT DOCUMENTS 08012151 1/1996 (JP) .

* cited by examiner

*Primary Examiner*—D. S. Nakarani
(74) *Attorney, Agent, or Firm*—Jordan and Hambuburg LLP

(57) ABSTRACT

An ink-fouling preventing sheet which is attached to a feed or delivery cylinder that supports and moves a printed paper in an offset press. The sheet comprises a flexible sheet base; an adhesive layer formed on the base; many small balls partially buried in the adhesive layer; a primer layer applied over the exposed convex portions of the small balls in the adhesive layer; and a set resin layer made of a silicone-modified urethane resin and applied on the primer layer to take the convex shapes of the small balls.

11 Claims, 2 Drawing Sheets

INK-FOULING PREVENTING SHEET

FIELD OF THE INVENTION

The present invention relates to a sheet attached to a feed cylinder, delivery cylinder, etc. in an offset press, which supports and carries printed papers successively. The inventive sheet prevent such cylinders from being fouled with the ink on printed paper. More specifically, it is an ink-fouling preventing sheet usable with a high durability for a long continuous printing.

BACKGROUND OF THE INVENTION

The offset printing ink used in a sheet-fed offset press is known to dry slowly. Also, it is well known that the drying speed is considerably influenced by the temperature and humidity.

Therefore, the feed cylinder and deliver), cylinder on which printed papers are carried, are likely to be fouled with the ink from the printed papers, causing a trouble in the printing process.

Accordingly, it has been proposed to use an ink-fouling preventing sheet on the surfaces of a feed cylinder and delivery cylinder of an offset printing press to prevent the cylinders from being fouled with the printing ink oil printed papers. For example, the Japanese Unexamined Patent Publication No. 57-169360 discloses a protective sheet of this type made of a woven fabric having a surface support layer made of a low-friction material, such as fluoroplastic (applied with a repellant). This is shown in FIG. 1. The woven fabric 11 is attached to a metallic surface 10A of a skeleton wheel 10 having an appropriate fixture (such as Velcro or the like) attached on either end thereof to securely hold the woven fabric 11 on the wheel 10. However, such woven fabric is disadvantageous in its low durability and thus not usable for a long continuous printing.

Also, a similar sheet is disclosed in the Japanese Unexamined Patent Publication No. 53-7841. It is shown in FIG. 2. This is a sheet comprising a base 14 on which ball-like glass beads 12 are attached with an adhesive 13. It is attached to a feed or delivery cylinder to prevent the same from being fouled with the printing ink. This prior art is intended to assure point contact of the glass beads with printed papers to minimize the area of contact with the surface of the printed paper and the amount of friction with the printed paper. This prior art is effective in minimizing the transfer of the ink from printed papers.

However, it is difficult to continuously prevent the glass beads from being stained with the ink on printed papers only at the point contact of the glass beads with printed papers. As offset printing is continuously done for a certain length of time, the glass beads repeatedly touch printed papers and thus have a cumulated transfer of the ink from printed papers. The ink thus cumulated on the glass beads will stain the subsequently printed papers.

To avoid such fouling with the ink on printed papers, it is frequently necessary to stop the offset press and clean the glass beads with a solvent such as cleaning oil (petrolic cleaning solvent of a high boiling point) in order to remove the ink from the beads. Therefore, the press cannot be continuously operated for a long time. The time and labor required for the cleaning, those required for removing and cleaning the sheet or the those required for replacing the fouled sheet with a fresh one, share a considerably large part of the time and labor needed for a printing process.

Accordingly, the present invention has an object to overcome the above-mentioned drawbacks of the prior art by providing an ink-fouling preventing sheet which can be used for a long time for daily printing for a long term without any cleaning with a cleaning solvent (a petrotic type of a high boiling point). The present invention provides for an offset printing press to be operated continuously for a long time of daily printing for a long term, and can be used as it is repeatedly washed in the cleaning oil after it is used for a long time, It has a highly improved durability.

SUMMARY OF THE INVENTION

The above object can be accomplished by providing an ink-fouling preventing sheet destined for use on the surface of a cylinder such as a feed cylinder, delivery cylinder, etc. of a printing machine. The sheet comprising a flexible base having provided thereon an adhesive layer having partially buried therein many small balls of which the exposed portions are coated with a primer to form a primer layer on which a set silicone-modified urethane resin layer is applied in such a manner that the resin layer surface takes the semi-spherical convexed shapes of the small ball portions left unburied in the adhesive layer. The sheet thus formed according to the present invention has a drastically improved durability, permitting a printing machine to be continuously operated for a long time.

According to one aspect of the present invention, the ratio of the silicone with urethane in the modified urethane resin resin ranges from 5:95 to 95:5.

According to another aspect of the present invention, the adhesive layer is made of an oil-resistant material.

According to yet another aspect of the present invention, the primer layer is made of a two-component urethane resin.

DETAILED DESCRIPTION OF THE INVENTION

Figure 1:
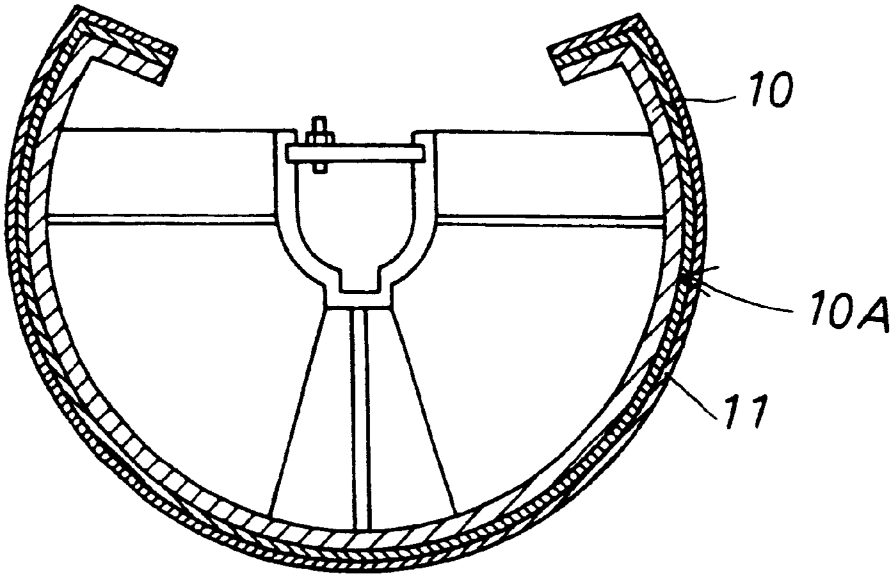
FIG. 1 (PRIOR ART)
FIG. 1 is a sectional view of a prior-art ink-fouling preventing sheet.
Figure 2:
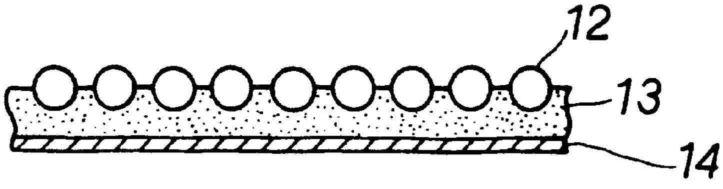
FIG. 2 (PRIOR ART)
FIG. 2 is a sectional view of a another prior-art ink-fouling preventing sheet.
Figure 3:
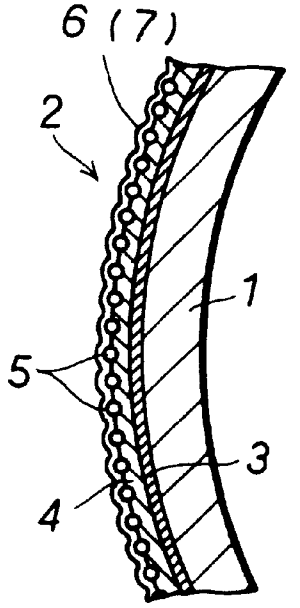
FIG. 3 is a sectional view, partially enlarged in scale, of a preferred embodiment of the present invention.

Referring now to the accompanying drawings, the present invention will be described in further detail hereinbelow. FIG. 3 is a sectional view, partially enlarged in scale, of an ink-fouling preventing sheet 2 attached to the surface of a cylinder 1 such as a feed cylinder (or delivery cylinder).

Figure 4:
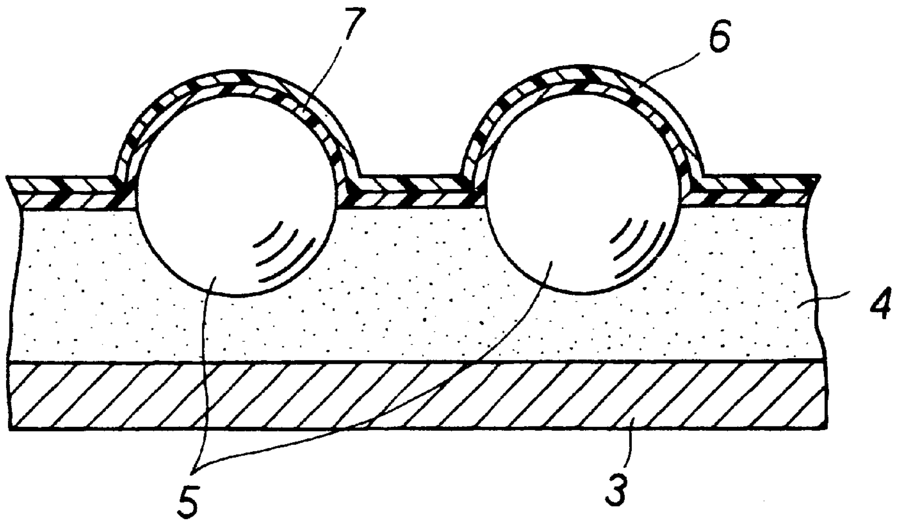
FIG. 4 is a sectional view, enlarged in scale, of the ink-fouling preventing sheet according to the present invention.

The ink-fouling preventing sheet 2 comprises a flexible base 3, an adhesive layer 4 formed on the base 3, many small balls 5 partially buried in the adhesive layer 4, a set resin layer 6 coated on the small balls 5, and a primer layer 7 (see FIG. 4). The surface of the set resin layer 6 takes the semi-spherical convexed shapes of the small ball portions left unburied in the adhesive layer 4.

FIG. 4 is a sectional view, enlarged in scale, of the ink-fouling preventing sheet 2. The base 3 should preferably be made of paper, plastic film. More preferably, it is made of a polyester film or fabric. The base 3 may be made of any other material which is flexible and has a smooth surface. Among these materials, the polyester film is most optimally usable as the base 3 because of its superiority in mechanical, electrical, chemical and thermal properties as well as in quality, stability and surface smoothness. When a fabric is used for the base 3, it should preferably be a plain weave polyester.

The adhesive for the adhesive layer 4 may be made of a polyolefin or polyester adhesive that can resist a cleaning oil (petrolic solvent of a high boiling point), for example, polyethylene. The adhesive layer 4 may be colored with a pigment.

The small balls 5 partially buried in the adhesive layer 4 may be glass beads, plastic or ceramic balls. Note that the plastic beads for the small balls should preferably be, for example, acrylic beads. Also, in case a ceramic is used to make the small balls 5, it may be of an aluminum oxide. The small balls 5 should preferably have a diameter of 50 to 200 $\mu$m. If the ball diameter is less than 50 $\mu$m, the balls will not provide any satisfactory point contact. If the diameter exceeds 200 $\mu$m, the balls 5 will possibly catch and scratch the printed paper. The diameter of the small balls 5 is appropriately selected from a range of 50 $\mu$m to 200 $\mu$m depending upon the kind and speed of printing, thickness, gloss and varnishing of the printed paper used.

The base 3 is coated with the adhesive layer 4 by knife coating or the like. An attached assembly of the adhesive layer 4 and a separate sheet in which the small balls 5 are partially buried is heated and pressed. The separate sheet is moistened to recover its original paper strength. The separate sheet is removed from the adhesive layer 4 so that the balls 5 are left partially buried in the adhesive layer 4.

Thus, the tops of the small balls 5 in the adhesive layer 4 are flush with each other as shown in FIG. 4. The set resin layer 6 is applied onto the small balls 5 and adhesive layer 4 in such a manner that the set resin layer 6 takes the semi-spherical convexed shapes of the balls 5.

The set resin layer 6 should (1) be able to evenly cover all the small balls 5, (2) have a high abrasion resistance and mold-releasability, (3) be chemically stable, not immigratinig to the printed paper, and (4) be highly resistant against a cleaning solvent. The substances satisfying these requirements include silicone modified acrylic resin, fluorine resin, silicone resin, etc. As the results of the experiments made by the present inventor, it has been proved that the silicone-modified urethane resin is most optimally usable for the set resin layer 6. For this reason, the set resin layer 6 is made of a silicone-modified urethane resin.

The set resin layer 6 in this embodiment is made of a silicone-modified urethane resin obtained through preparation of a urethane resin of 500 to 10,000 in molecular weight composed of a polyol containing OH as a terminal group, diisocyanate compound and chain expander and substitution of a part or majority of the polyol with a reactive silicone oil containing OH at either end thereof.

The polyol composing the urethane resin used to form the set resin layer 6 may be any of the following:

(1) Polyester polyol (2) Polycarbonate polyol

This polyol is obtainable through ester interchange between a low molecular weight diol such as 1.4-butane diol, 1.6-hexane diol and a low molecular weight carbonate compound such as ethylene carbonate, dimethyl carbonate or diphenyl carbonate.

(3) Polycaprolactone polyol (4) Valerolactone (Poly $\beta$-methyl-$\delta$-valerolactone) nmethylene glycol (5) Polytetramethylenle glycol This is obtainable through ring opening polymerization of for example, $\epsilon$-caprolactone, $\beta$-methyl-$\delta$-valerolactone and tetrahydrofuran of the abovementioned (3) and (4).

(6) Polypropyleneglycol (7) Polyethyleneglycol

This is obtainable through polymerization of a low molecular weight diol such as ethylenieglycol or polypropylene glycol or (6) and (7) and alkylene oxide.

(8) Polyolefinglycol

This is obtainable from, for example, a hydroxyl terminated polybutadiene glycol. Also, the polyol can be produced from each of (1) to (8) or a plurality of them in combination. A blocked polyol (blocked polyol of, for example, tetrahydrofuran or ethylene dioxide) of the polyols (1) to (7). The details of the components of these urethane resins are referred to in the "Handbook of Polyurethane" (Edited by Keiji Iwata, Nikkan Kogyo shinbun).

The reactive silicone oil containing OH group at either end thereof obtained through substitution of a part or majority of the polyol in the urethane resin used to form the set resin layer 6 is expressed with the following chemical formula:

Chemical formula 1:

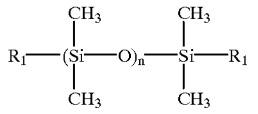

$R_1$ is $—C_3H_6OC_2H_4OH$

Chemical formula 2:

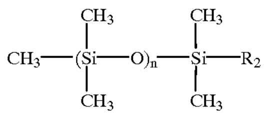

wherein $R_2$ is

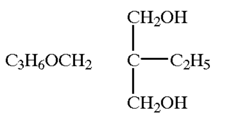

In the above formulas, each of $R_1$ and $R_2$ is alkyleneetheralcohol which is of, for example, a carbitol-modified one. The silicone oil containing the hydroxyl group at either end thereof which is equivalent to 20–112 mg of KOH per 1 g of the silicone oil may preferably be used in these chemical formulas.

The silicone-modified urethane resin of the set resin layer 6 should use the silicon compound and polyol compound at a molar ratio ranging from 5.0:95.0 to 95:5, and more preferably at a molar ratio within a range from 10:90 to 50:50. If the amount of the silicon compound is 5 mols or less, the set resin layer 6 will have an improved oil resistance but will easily be stainable and not sufficiently releasable. If the amount of the silicon compound is 50 mols or more, the set resin layer 6 will be sufficiently releasable but its oil resistance will be lower.

The diisocyanate compound of the urethane resin may be any of the following:

(1) Aromatic diisocyanate compound such as tolylene diisocyanate or diphenyl methane diisocyanate (2) Alicyclic diisocyanate compound such as isophorone diisocyanate, xylene diisocyanate, 1,3-bis (isocyanate methyl) cyclohexane, dicyclohexyl methane diisocyanate, (3) Aliphatic diisocyanate compound such as lysine diisocyanate, hexametlhylene diisocyanate, dimer acid diisocyanate or tetramethyl-xylene diisocyanate by American cynamid The diisocyanate compound may be an isocyanate compound containing carbodiimide group or diner of isocyanate compound (e.g., Duranate D-20 by the Asahi Chemical Industry Co., Ltd.)

The chain expander composing the silicone-modified urethane resin of the set resin layer 6 may be, for example, a diol compound or a triol compound.

The diol compound may be selected from among aliphatic and alicyclic compounds such as ethylene glycol, diethylene glycol, propylene glycol, 1,3-butane diol, 1,4-butane diol, 3,3-dimethylol heptane (Japanese Examined Patent Publication No. 5-57286), 3-methyl-1,5-pentane diol, 1,6-hexanediol, neopenthyl glycol or cyclohexane dimethanol.

The polyesterpolyol composing the urethane resin may be a polyester polyol obtainable from dicarboxylic acid and a diol. Also, a triol (glycerin or trimethylol propane) may be used in such an amount as will not inhibit the production of polyester polyol. Also, trimellitic acid or trimellitic acid anhydride may be used in such an amount as will not inhibit the production of the polyester polyol.

(1) The dicarboxylic acid may contain an aromatic dicarboxylic acid such as terephthalic acid, isophthalic acid, dimethlyl terephthalic acid, dimethyl isophthalic acid, phthalic acid anhydride, adipic acid, sebacic acid, azelaic acid, 1,6-hexane dicarboxylic acid, 1,10-decanoic dicarboxylic acid, 1,12-dodecanoic dicarboxylic acid or 1,18-octadecanoic dicarboxylic acid.

(2) The diol may contain an aliphatic or aliphatic diol compound such as ethylene glycol, diethylene glycol, propylene glycol, 1,3-butane diol, 1,4-butane diol, 3,3-dimethylol heptane (Japanese Examined Patent Publication No. 5-57286), 3-methyl-1,5-pentane diol, 1,6-hexanediol, neopenthyl glycol or cyclohexane dimethanol.

According to the present invention, a priming is done as will be described below before forming the set resin layer 6 to form the primer layer 7 as shown in FIG. 4.

The purpose of "priming" is to apply a two-component polyurethane resin to the small balls 5 to form the primer layer 7. However, the present invention is not limited only to this manner of priming. For example, a silane coupling agent and a two-component polymer may be used as the two-component polyurethane resin. The two-component polymer may be composed of a two-component epoxy resin, for example, Epikote 828 (By Shell) and polyamide hardener (diethylene triamine) or terminal hydroxyl group, respectively, acrylic prepolymer having an amino group and amino group and polyisocyanate hardener, vinyl copolymer having OH group and hydroxyl group such as Vinilite VAGA (by Union Carbide) and polyisocyanate hardener, or polyester and isocyanate hardener.

The primer layer 7 is applied in a small amount and evenly onto the small balls 5 to rigidly bond the small balls 5 to set resin layer 6. In case the small balls 5 are made of a plastic or glass, a two-component resin should preferably be used to form the primer layer 7 between the small balls 5 and set resin layer 6. Cross-linking of the two-liquid urethane increases the adhesiveness between the small balls 5 and set resin layer 6 and increases the oil resistance. Note that the primer layer 7 should preferably be 1 to 10 $\mu$m thick.

The urethane resin for the urethane adhesive composition in the primer layer 7 is obtainable from an adhesive composition consisting of a urethane resin obtained from the above-mentioned polyol compound, diisocyanate compound and diol compound (chain expander) and a polyisocyanate cross-linking agent compound which will be described below.

The polyisocyanate cross-linking agent compound usable as the urethane resin composition of the primer layer 7 may be any one of the following:

(1) Polyfunctional isocyanate compound cross-linking agent of isocyanuric structure
Ex. Duranate THA-100 (hexamethylene isocyanate; by Asahi Chemical Industry)

(2) Polyfunctional isocyanate compound cross-linking agent of biuret-bond structure
Ex. Duranate 24A-100 (hexamethylene diisocyanate: by Asahi Chemical Industry)

(3) Polyisocyanate compound cross-linking agent using more than one isocyanate compounds
Ex. Duranate made of hexamethylene diisocyanate/isophorone diisocyanate (4) Additional mass of diisocyanate compound
Tolylene diisocyanate, hexamethylene diisocyanate, xylene di isocyanate or isophorone diisocyanate (5) Polyisocyanate compound
Tolylene diisocyanate To increase the adhesiveness of the primer layer 7 with the small balls 5 (glass beads), the urethane resin adhesive composition of the primer layer 7 may be used with a silane coupling agent or silicon isocyanate compound. Note that the details of these diisocyanate compounds and polyisocyanate compounds are referred to in the aforementioned "Handbook of Polyurethane" (by Kenji Iwata, Nikkan Kogyo Shinbun: especially, Table 10.4 on page 441, which states that the isocyanate compound can be used as cross-linking agent).

The two-component urethane resin for primer layer 7 in this embodiment can be produced as follows:

Polycarbonate diol in 1.0 mol (56 hydroxyl groups and 2000 in molecular weight, Nippoan 980L by Nippon Polyurethane Industry or Desmophen E-2020 by Bayer AG.) was put into a urethane resin reactive oven. The oven temperature was raised Up to 105° C. It was heated in the flow of nitrogen and dehydrated for 1 hour. The oven temperature was adjusted to 80 to 90° C. 0.1 mol of 1,4-butane diol (chain expander) and 0.05 mol of di-n-butyl tin dilaurate (catalyst) (polycarbonate polyol) and 95% of 4,4-diphenyl methane diisocyanate (1.1 mol) and 10% of dimethyl formamide (70% of the entire amount or the materials) were added to the polycarbonate diol. After 2 hours of reaction among them, the oven temperature was increased up to 90 to 95° C. The oven was kept at this temperature for 2 hours for a further reaction among the materials. As the mixture has a higher viscosity, a solvent was added to the mixture to provide a viscosity permitting the mixture to be sufficiently stirred. Two hours later, all the remainder of the diisocyanate compound was added to the mixture. The mixture was kept for another 2 hours for a further reaction. After that, the remainder of the solvent and 1,4-butane diol (reaction stopping agent) were added to the mixture. After confirming, by an infrared analysis, that the isocyanate group had disappeared, the mixture was stopped from further reacting.

The mixture resulted in a urethane resin solution of 30% in solid content, about 300 in viscosity (pascal stokes second/25° C.). The solution was a clear, thick one.

The sheet according to the present invention was attached to a feed cylinder in an offset press. The press was operated at various printing speeds to make offset printing on various printed papers. This procedure was repeated also with a conventional ink-fouling preventing sheet prepared by bonding only glass beads to a sheet of paper. These experiments compare a conventional sheet and a sheet according to the present invention to determine how long it takes for the sheet to be worn out and replaced with a fresh one.

The experiment results are shown in Table 1.

TABLE 1

| | | Type of | Evaluation of durability (time length) | |
|---|---|---|---|---|
| Print speed (Sheets/h) | Type of print sheet | offset print ink | Prior-art sheet | Present invention |
| 10,000 to 13,000 | Thin Art Wood-free Coated | Oil | Somewhat low (133 hours/ 7 days) | Very high (1997 hours/ 63 days) |
| 3,000 to 6,000 | Thick | UV | Low (95 hours/ 5 days) | High (950 hours/ 50 days) |
| 10,000 to 13,000 | Thin Art Wood-free Coated | Water-free Litho ink | Somewhat low (144 hours/ 6 days) | Very high (1064 hours/ 56 days) |

As apparent from Table 1, the present invention has a durability considerably (approximately 9 to 10 times) higher than the prior-art sheet. A similar experiment was conducted using a prior-art sheet in which flourine was applied to the glass beads. The results were nearly the same as those with the first test pieces. The fluorine-coated sheet is considered to be fragile and low in abrasion resistance.

For comparison of oil resistance (solvent resistance) between the prior-art sheet and the present invention, three types of sheets according to the present invention were prepared, as detailed below.

(1) Test piece A

The primer layer 7, and then a silicone-modified urethane resin for the set resin layer 6 applied to the small balls 5 and adhesive layer 4.

(2) Test piece B

The silicone-modified urethane resin for the set resin layer 6 was applied to the small balls 5 and adhesive layer 4.

(3) Test piece C

Only the silicone was applied to the small balls 5 and adhesive layer 4.

For this experiment, a polyester sheet of 180 $\mu$m in thickness was used as the base 3. Glass beads of 50 $\mu$m in diameter were used as balls 5. They were bonded to the base 3 at a density of about 20,000 pieces/$cm^2$ with a solvent-resistant adhesive.

Also, a rubbing tester for use in the anti-friction color fastness testing method stipulated in JIS L 0862 or JIS L 0849 was used in this experiment. A rubbing piece covered with a white cotton cloth was used. Under a weight of 900 g, the rubbing piece was reciprocated on the test piece surface at a rate of about 30 strokes/min while a petrolic solvent (toluene) of a high boiling point was being dripped onto the test piece surface. The test piece surface was observed. The results of this evaluation are shown in Table 2.

TABLE 2

| Test piece | Surface state | | Mold-releasability |
|---|---|---|---|
| A | 200 times of rubbing: | No abnormality | No change in releasability of adhesive Kraft tape |
| B | 50 times of rubbing: | Separation of silicon-molded urethane resin | Measurement was impossible |
| C | 10 times of rubbing: | Separation of silicon-molded urethane resin | Measurement was impossible |

As apparent from Table 2, the test piece A has the best abrasion resistance in the presence of the high boiling-point petrolic solvent. It is considered that the effect of the silicone-modified urethane resin as a cross-linking agent increased the abrasion of the set resin layer 6 to the small balls (glass beads) 5.

As having been described in the foregoing, the ink-fouling preventing sheet according to the present invention comprises the flexible sheet base, the adhesive layer applied to the base, manly balls partially buried in the adhesive layer, the primer layer applied over the small balls and adhesive layer and the set resin layer formed by a silicon-modified urethane resin and applied to the primer layer, so that the set resin layer takes the convex shapes of the small balls. Therefore, the printed paper has an improved point contact with the sheet, the ink on the printed paper can be better repelled, and the set resin layer 6 is more strongly connected to the small balls 5 by means of the primer layer 7.

Therefore, an ink-fouling preventive sheet can be provided which is considerably higher in abrasion resistance, namely, higher in durability. The sheet can thus be used continuously for a longer time with no maintenance, which contributes very much to a long time continuous operation of a press and thus to a considerably high productivity.

According to the present invention, the adhesive layer and set resin layer are chemically stable so that the components will not bleed out of the layers and immigrate to the printed paper. Thus, the finished surface of the printed paper can be protected from being fouled, leading to a considerably higher quality of the printed matters. Also, the sheet according to the present invention is highly oil-resistant. If the ink on a printed sheet adheres to the sheet, it can be easily wiped off the sheet surface with a high boiling-point petrolic solvent and thus the sheet can be repeatedly reused.

Industrial Application

As having been described in the foregoing, the ink-fouling preventing sheet according to the present invention is destined for use on a feed or delivery cylinder (on its surface) in an offset press which moves or carries a printed paper surface at the surface thereof.

What is claimed is:

1. An ink-fouling preventing sheet for use on the surface of a feed or delivery cylinder in a press, comprising:

a flexible sheet base;

an adhesive layer formed on the base;

balls partially buried in the adhesive layer, whereby convex portions of the balls are exposed;

a primer layer formed over the exposed convex portions of the balls in the adhesive layer and an exposed surface of the adhesive layer between the balls; and a heat set resin layer made of a silicone-modified urethane resin coated on the primer layer and retaining the convex shapes of the balls.

2. The sheet as set forth in claim 1, wherein the silicone-modified urethane resin is derived by chemically reacting a mixture of a reactive silicone oil containing a hydroxyl group at either end and polyol having hydroxyl terminal groups with diisocyanate, wherein a mol ratio of the reactive silicone oil and the polyol is within a range of 5:95 to 95:5.

3. The sheet as set forth in claim 1, wherein the adhesive layer is made of an oil-resistant material.

4. The sheet as set forth in claim 3, wherein the adhesive layer is selected from the group consisting of a polyolefin, a polyester, and a polyethylene.

5. The sheet as set forth in claim 1, wherein the primer layer is made of a two-component urethane resin.

6. The sheet as set forth in claim 1, wherein the balls have a diameter of 50 to 200 microns.

7. An ink-fouling preventing sheet for use on a surface of a cylinder in a press, comprising:

a flexible sheet base;

an adhesive layer formed on the base;

balls partially buried in the adhesive layer, whereby convex portions of the balls are exposed;

a primer layer formed over the exposed convex portions of the balls in the adhesive layer, surface areas of the balls corresponding to buried portions thereof being directly bonded to the adhesive layer; and a heat set resin layer made of a silicone-modified urethane resin coated on the primer layer and retaining the convex shapes of the balls.

8. The sheet as set forth in claim 7, wherein the balls have a diameter of 50 to 200 microns.

9. The sheet as set forth in claim 7, wherein the adhesive layer is made of an oil-resistant material.

10. The sheet as set forth in claim 9, wherein the adhesive layer is selected from the group consisting of a polyolefin, a polyester, and a polyethylene.

11. The sheet as set forth in claim 7, wherein the primer layer is made of a two-component urethane resin.

* * * * *